United States Patent
Thomas et al.

(10) Patent No.: US 8,891,917 B2
(45) Date of Patent: Nov. 18, 2014

(54) TRANSVERSE MODE FILTER FOR WAVEGUIDES

(75) Inventors: Jens Ulrich Thomas, Jena (DE); Christian Voigtlaender, Jena (DE); Stefan Nolte, Jena (DE); César Jáuregui Misas, Jena (DE); Fabian Stutzki, Jena (DE); Jens Limpert, Jena (DE); Andreas Tuennermann, Welmar (DE)

(73) Assignees: Fraunhofer-Gesellschaft zur Foerderung der angewandten Forschung e.V., Munich (DE); Friedrich-Schiller-Universitaet Jena, Jena (DE)

( * ) Notice: Subject to any disclaimer, the term of this patent is extended or adjusted under 35 U.S.C. 154(b) by 153 days.

(21) Appl. No.: 13/496,630
(22) PCT Filed: Sep. 15, 2010
(86) PCT No.: PCT/EP2010/005646
§ 371 (c)(1),
(2), (4) Date: May 25, 2012
(87) PCT Pub. No.: WO2011/032684
PCT Pub. Date: Mar. 24, 2011

(65) Prior Publication Data
US 2012/0237162 A1 Sep. 20, 2012

(30) Foreign Application Priority Data
Sep. 18, 2009 (DE) .......................... 10 2009 041 891

(51) Int. Cl.
| G02B 6/26 | (2006.01) |
| G02B 6/14 | (2006.01) |
| G02B 6/293 | (2006.01) |
| H01S 3/067 | (2006.01) |
| G02B 6/02 | (2006.01) |

(52) U.S. Cl.
CPC .............. *G02B 6/29356* (2013.01); *G02B 6/14* (2013.01); *G02B 6/021* (2013.01); *H01S 3/06729* (2013.01); *G02B 6/0208* (2013.01)
USPC .......................................................... 385/29

(58) Field of Classification Search
None
See application file for complete search history.

(56) References Cited

U.S. PATENT DOCUMENTS

| 5,048,913 A | 9/1991 | Glenn et al. |
| 5,732,169 A * | 3/1998 | Riant et al. ...................... 385/24 |

(Continued)

FOREIGN PATENT DOCUMENTS

DE     197 27 125     1/1999

OTHER PUBLICATIONS

German Office Action dated Apr. 30, 2010 in German Patent Application No. 10 2009 041 891.1-51 along with an English translation of relevant parts of same.

(Continued)

*Primary Examiner* — Sung Pak
(74) *Attorney, Agent, or Firm* — Collard & Roe, P.C.

(57) ABSTRACT

The invention relates to a transverse mode filter in an optical waveguide (3). The aim of the invention is to produce a transverse mode filter that permits a monolithic construction of a laser in a multi-mode waveguide. To achieve this, according to the invention the filter comprises a Fabry-Perot cavity integrated into the optical waveguide (3) and comprising two reflective elements (5) situated at a distance from one another. In addition, the waveguide (3) is modified in the region of the Fabry-Perot cavity and/or in the region of the reflective elements (5) in relation to the remaining regions of the waveguide with respect to the effective refractive index of at least one mode of the waveguide.

8 Claims, 4 Drawing Sheets

(56) References Cited

U.S. PATENT DOCUMENTS

Figure 1:
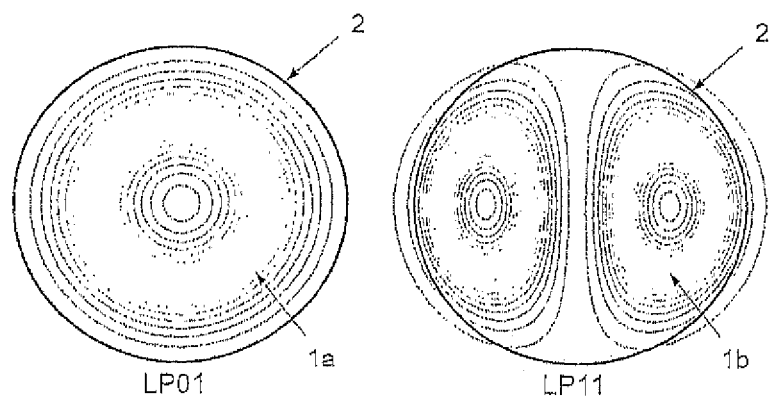

| | | | | |
|---|---|---|---|---|
| 5,892,582 | A | * | 4/1999 | Bao et al. ............. 356/519 |
| 6,115,122 | A | * | 9/2000 | Bao et al. ............. 356/480 |
| 2003/0123827 | A1 | | 7/2003 | Salerno et al. |
| 2009/0034900 | A1 | | 2/2009 | Nakagawa |

OTHER PUBLICATIONS

International Search Report of PCT/EP2010/005646, date of mailing Jun. 1, 2011.
Toru Mizunami et al., "Bragg Gratings in Multimode and Few-Mode Optical Fibers," Journal of Lightwave Technology, vol. 18, No. 2, Feb. 2000, XP011029658 (ISR).
Dietmar Johlen et al., "Fiber Fabry-Perot Interferometer with Mode-Converting Bragg Gratings", Journal of Lightwave Technology, vol. 18, No. 11, Nov. 2000, XP011029810 (ISR).
Cheng X P et al., "Single-Longitudinal-Mode Erbium-Doped Fiber Ring Laser Based on High Finesse Fiber Bragg Grating Fabry-Perot Etalon", IEEE Photonics Technology Letters, vol. 20, No. 12, Jun. 15, 2008, pp. 976-978, XP011214861 (ISR).
Melloni A. et al., "Equivalent ciruity of Bragg gratings and its application to Fabry-Perot Cavities", Journal of the Optical Society of America A (Optics, Image Science and Vision), vol. 20, No. 2, Feb. 2003, pp. 273-281, XP002627444 (ISR).
Morey W W et al., "Fiber Fabry-Perot Interferometer Using Side Exposed Fiber Bragg Gratings", Proceedings of the Optical Fiber Communication Conference, vol. Conf. 15, Feb. 2, 1992-Feb. 7, 1992, p. 96, XP000341614 (ISR).
Stutzki F. et al., "Passively stabilized 215 W monolithic CW LMA-fiber laser with innovative transversal mode filter", Fiber Lasers VII: Technology, Systems and Applications. Proceedings of the SPIE, vol. 7580, Jan. 25, 2010, pp. 75801K-1 to 75801K-10, XP002627447 (ISR).

\* cited by examiner

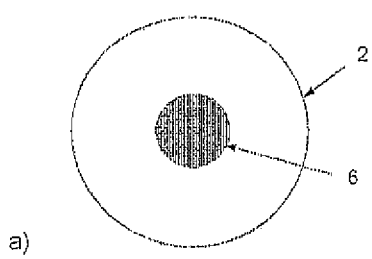
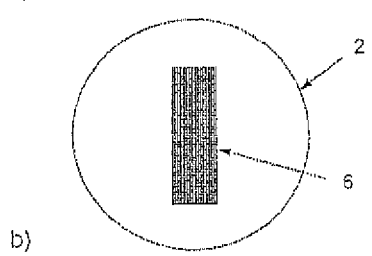
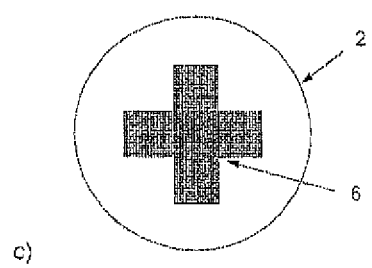
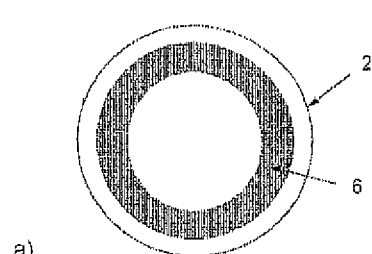
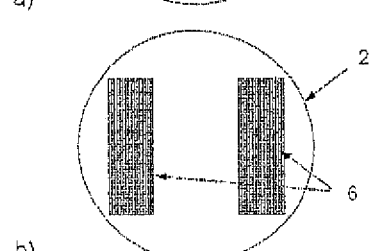
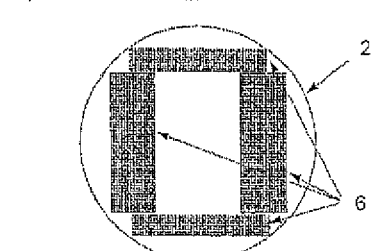
Fig. 6     Fig. 7

TRANSVERSE MODE FILTER FOR WAVEGUIDES

CROSS REFERENCE TO RELATED APPLICATIONS

This application is the National Stage of PCT/EP2010/005646 filed on Sep. 15, 2010, which claims priority under 35 U.S.C. §119 of German Application No. 10 2009 041 891.1 filed on Sep. 18, 2009, the disclosure of which is incorporated by reference. The international application under PCT article 21(2) was not published in English.

The invention relates to a transverse mode filter in an optical waveguide.

Transverse mode filters in optical waveguides play an important role, among others in the improvement of fiber lasers.

In the course of the past years, fiber lasers have opened up a great field of application because of their compactness, temperature stability, and high efficiency. They are applied, for example, in medicine or material processing. Using an optical fiber as active medium enables a monolithic construction of the fiber laser. A monolithic construction avoids typical weak points of other laser types, more particularly a sophisticated adjustment of the input and output coupler mirrors which if not executed correctly may entail substantial performance losses of the resonator.

Owing to the demand for ever more powerful lasers in general, and thereby for powerful fiber lasers, too, the high light bundling on a very small fiber cross-section with the applied mono mode fibers produces non-linear effects which adversely affect the performance stability of the fiber laser. For this reason, a switch has been made meanwhile to using so-called LMA-fibers (Large Mode Area). LMA-fibers have a larger core diameter than usual mono mode fibers, applying a slight numerical aperture to ensure that they only carry the least possible number of transverse modes. The large core area in LMA-fibers now leads to a lesser performance density within the fiber core, which thereby also carries several transverse modes apart from the base modes. The transverse modes in turn adversely affect the stability and beam quality of the laser beam.

Therefore, for a long time, there has been a demand for providing a possibility of a transverse mode filtration which reduces the transverse modes within an optical fiber, for example an LMA-fiber.

There are prior art solutions known which apply "tapered" elements or mono mode fiber sections in the laser cavity. But these techniques have a disadvantage in that they prevent a monolithic construction of a fiber laser or that they provoke performance losses in the resonator. Likewise, it is known to achieve transverse mode attenuation by way of a well-aimed fiber bending with a correspondingly small bending radius. This makes use of the mode dependence of the bending losses of the fiber. However, with a strong bending, this method reduces the effective mode area and thus limits the advantages of the LMA-fiber concept.

Now, therefore, it is the object of the present invention to provide a transverse mode filter that does not adversely affect the advantages of the LMA-fiber concept and that allows for a monolithic construction of a fiber laser. And at the same time it is intended to achieve high laser efficiency.

To solve this task, the present invention proposes that the filter comprises a Fabry-Perot cavity integrated in the optical waveguide and comprising two reflective elements situated at a distance from each other, wherein the wavelength of at least one first mode of the optical waveguide differs from the resonant wavelengths of the Fabry-Perot cavity, whereas the wavelength of at least a second mode of the optical waveguide mainly coincides with a resonant wavelength of the Fabry-Perot cavity.

The spectral positions, i.e. the wavelengths of the individual resonances of the Fabry-Perot cavity depend on the length of the cavity and on the effective refractive index of the corresponding transverse mode within the cavity. The filter is so configured that different optical wavelengths are generated within the cavity depending on the mode. This leads to a mode-dependent shifting of the resonances of the Fabry-Perot cavity. Those modes of the optical waveguide in which the Fabry-Perot cavity is not resonant, are reflected, others are transmitted. This results in a filter mechanism for certain modes of the optical waveguide.

Within the sense of the present invention, the Fabry-Perot cavity is so configured that at least the wavelength of a first mode of the optical waveguide differs from the resonant wavelengths of the Fabry-Perot cavity. This first mode cannot pass through the Fabry-Perot cavity, hence it is strongly reflected there. In accordance with the present invention, the wavelength of at least a second mode mainly coincides with one of the resonant wavelengths of the Fabry-Perot cavity. It means the spectral lines of the corresponding resonance of the Fabry-Perot cavity and of the second mode must overlap each other at least partly. Hence the second mode passes through the Fabry-Perot cavity and accordingly it is only reflected there weakly. Applying the arrangement in the reflectance direction, the first mode is accordingly selected and the second mode is suppressed. This results in the inventive filtration effect.

In accordance with a preferred embodiment of the present invention, it is provided for that the waveguide in the region of the Fabry-Perot cavity and/or in the region of the reflective elements is modified in relation to the remaining regions of the waveguide with respect to the effective refractive index of at least one mode of the waveguide. Hereby, the mode-dependent different optical wavelengths described hereinabove and thus the mode-dependent shifting of the resonances of the Fabry-Perot cavity can be generated practically in a very simple manner.

The reflectance spectrae of the reflective elements of the inventive filter may be comprised of several resonances (e.g. one for each transverse mode), for instance if the reflective elements are configured as Bragg gratings in a multi-mode waveguide as described further below. The different effective refractive indices of the transverse modes lead to different Bragg wavelengths for the different modes. Accordingly, the transverse modes show different wavelengths and are spectrally separated from each other.

With a preferred embodiment of the present invention, the optical waveguide is a light-conducting fiber with a fiber core and a fiber shell. Accordingly, the fiber core within the Fabry-Perot cavity may have a refractive index variation that runs transversally to the fiber axis. By way of the refractive index variation, the inventive filtration effect as outlined hereinabove is realized in the way that mode-dependent different optical path lengths are generated within the fiber. For example, the optical path length near the fiber axis can be increased, whereas a lesser optical path length occurs in those regions near the shell. The refractive index variation over the cross-section of the fiber takes a different effect on the relevant optical path length according to the geometrically different field distribution of the modes. Thus it is possible to ensure in a well-aimed manner that individual modes do not fulfill the resonance condition of the Fabry-Perot cavity and are selected accordingly. This is important against the background that with all modes of the fiber (without refractive index variation) in which the reflective elements of the Fabry-Perot cavity are resonant, the wavelengths of all these modes are also automatically in conformity with the resonant wavelengths of the Fabry-Perot cavity. This conformity is abolished in a well-aimed manner by way of the refractive index variation as described hereinabove.

According to the invention, the fiber shell within the Fabry-Perot cavity may also comprise a refractive index variation running transversally to the fiber axis in order to achieve the effect described. The refractive index variation of the fiber shell can be provided individually or additionally to the refractive index variation of the fiber core.

Furthermore it is possible that the fiber core and/or the fiber shell in the region of at least one of the reflective elements comprise a refractive index variation running transversally to the fiber axis or comprise another transversal inhomogeneity. The desired filtration effect can be realized hereby, too.

The transversal refractive index variation described hereinabove may show a stepped curve or a gradient curve. For example, circular, annular, cross-shaped, or quadratic geometries of the refractive index variation running transversally to the longitudinal axis of the waveguide. Likewise, it is possible that the refractive index variation in the direction of two orthogonal transversal axes of the waveguide is different. In this case, it results a polarization-dependent filtration effect.

The inventive Fabry-Perot cavity can be completely inscribed by common laser processes into an optical waveguide. For example, pulsed fs-lasers which selectively modify local properties, e.g. the refractive index of the fiber core, are utilized for this purpose.

According to a particularly practicable embodiment of the present invention, the reflective elements are waveguide-Bragg gratings, as has been mentioned hereinabove. Reflective elements of this kind have a narrow-band spectrum and can be produced easily and cost-efficiently, e.g. as fiber Bragg gratings.

In accordance with the present invention, the reflective elements may comprise both equal reflectance spectrae and different reflectance spectrae. The crucial point for the function of the Fabry-Perot cavity is that the reflectance spectrae overlap in the region of the waveguide modes to be filtered.

The inventive transverse mode filter is particularly suitable for use in a laser, more particularly in a high-duty fiber laser. Here it is possible to realize a mainly monolithic construction which is distinguished by high stability and beam quality because of the transverse mode filtration. The transverse mode filter is expediently applied directly in the active fiber of the laser.

The task being the object of the present invention is also solved by a transverse mode filter which comprises a Fabry-Perot cavity integrated into the optical waveguide and comprising two reflective elements situated at a distance from each other and having different reflectance spectrae, wherein the wavelengths of the modes of the optical waveguide mainly coincide with the resonant wavelengths of the Fabry-Perot cavity. Here, the filtration characteristics are mainly determined by the reflectance spectrae of the reflective elements which see to it that individual modes are suppressed versus other modes.

Figure 2:
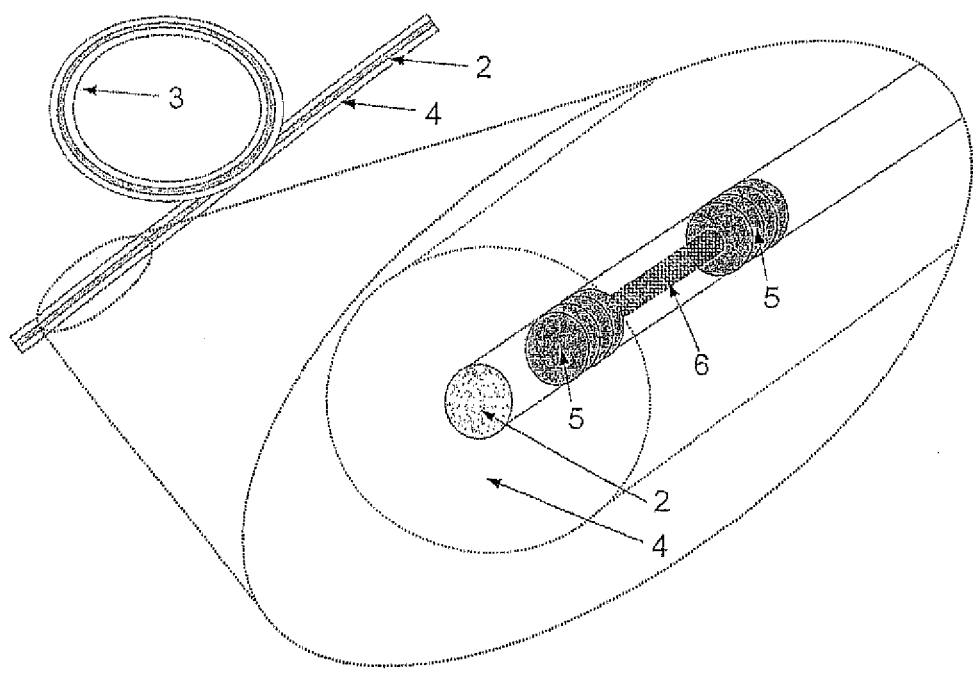
Figures 3A, 3B:
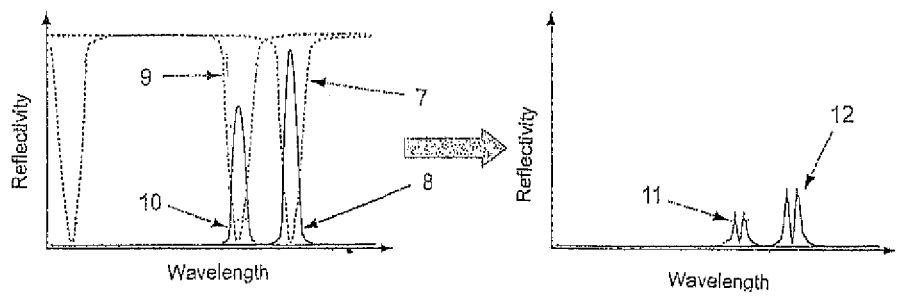
Figure 4:
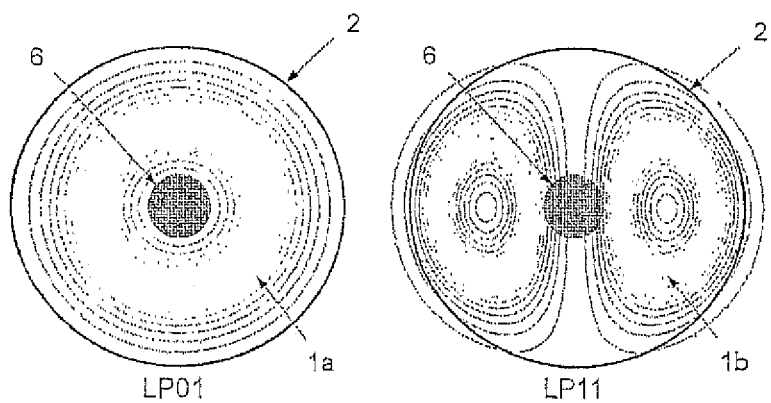
Figures 5A, 5B:
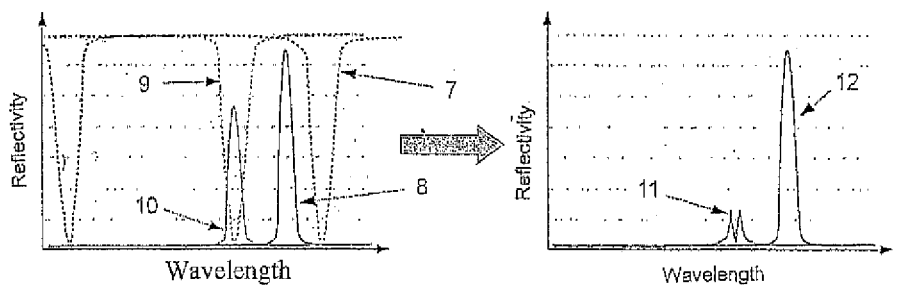
Figure 8:
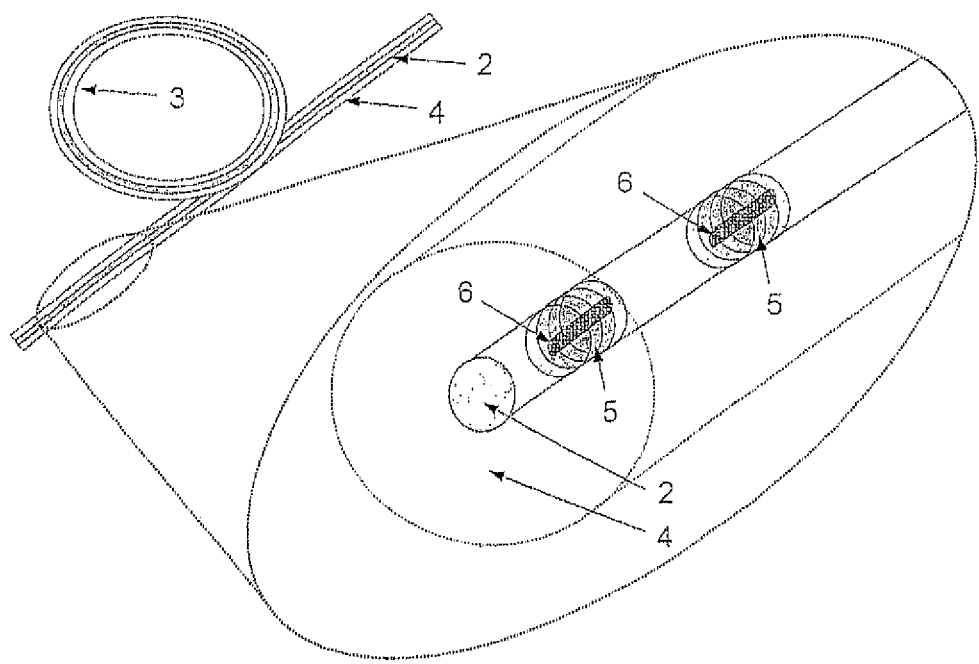

Practical examples of the present invention are elucidated in greater detail based on the relevant drawings which show the following:

FIG. 1 Cross-sections of the fiber core with different transverse modes,

FIG. 2 An optical fiber with an integrated transverse mode filter,

FIG. 3a Reflectance spectrae of the reflective elements and the Fabry-Perot cavity without refractive index variation, FIG. 3b Overall reflectance spectrum without refractive index variation, FIG. 4 Cross-sections of the fiber core with refractive index variation and field contour lines of different transverse modes, FIG. 5a Reflectance spectrae of the reflective elements and the Fabry-Perot cavity according to the invention, FIG. 5b Overall reflectance spectrum of the transverse mode filter, FIGS. 6 and 7 Cross-sections of the fiber core with different refractive index variations, FIG. 8 An optical fiber with integrated transverse mode filter in another variant.

Shown in FIG. 1 are two cross-sections of a fiber core 2 of a light-conducting fiber. The fiber carries two modes LP01 and LP11, whose different field curve 1a and/or 1b is recognizable based on the contour lines illustrated in FIG. 1. Along each contour line, the amplitude of the electrical field of the relevant mode is constant. An effective refractive index is allocated to each of these modes. The mode with the highest effective refractive index (LP01) usually is the base mode, whereas the remaining modes (LP11) are designated as modes of a higher order. The modes of a higher order are usually not desired, because they reduce the exploitable performance of the relevant optical system. Therefore, there is a demand for constructional elements that are able to reduce the intensity of the modes of a higher order in relation to the intensity of the base mode. Constructional elements of this kind are transverse mode filters in the sense of the present invention.

FIG. 2 is an exemplary illustration of en optical stepped index fiber 3. It is comprised of a fiber core 2 and a fiber shell 4 surrounding the core. A section of this fiber is illustrated in a magnified view. Provided for within the fiber core 2 is a Fabry-Perot cavity which comprises two reflective elements 5 as well as a refractive index variation 6. The reflective elements 5 are configured as fiber Bragg gratings. These structures are periodic modifications of the refractive index of the fiber core in fiber length direction which act like a monochromatic mirror. The transversal refractive index modification 6 within the Fabry-Perot cavity is configured as a stepped index variation. Here, the refractive index within volume 6, configuring a sharp index leap in transversal direction, differs from the refractive index within the remaining fiber core 2. As one can see in FIG. 2, the transversal refractive index variation is restricted to the region of the Fabry-Perot cavity. Outside the reflective elements and the Fabry-Perot cavity, the fiber core 2 is invariable with regard to the refractive index.

FIG. 3 illustrates the reflectivity of the Fabry-Perot cavity with fiber Bragg gratings without transversal refractive index variation. If the length of the Fabry-Perot cavity is so chosen that one of its resonances is In conformity with the wavelength of a mode of the fiber and at the same time with the Bragg wavelength of the reflective elements 5 or mainly coincides with them, then the wavelengths of all modes reflected by the fiber Bragg gratings coincide with the resonances of the Fabry-Perot cavity. This situation is illustrated in FIG. 3a. The reflectance spectrum of the Fabry-Perot cavity is depicted as a dashed curve for two transversal modes. The base mode 7 and a mode of a higher order 9. As one may see, the reflectance spectrum of the Fabry-Perot cavity has a high reflectivity for those wavelengths in which the Fabry-Perot cavity is not resonant, i.e. outside the resonance lines 7 and 9. With the resonant wavelengths, the Fabry-Perot cavity is nearly transparent, and the light can pass through. FIG. 3a furthermore shows the reflectance spectrum of the reflective elements 5 as a straight-through curve. The overall reflectance spectrum of the structure is a combination of the reflectance spectrae of the cavity and of the reflective elements. As one may see in FIG. 3a, the resonances 8, 10 of the reflective elements 5 and the resonances 7, 9 of the Fabry-Perot cavity coincide for both modes. In result, as shown by the overall reflectance spectrum in FIG. 3b, the light mainly passes on the whole through the Fabry-Perot cavity. The overall reflectivity is strongly reduced equally for both modes 11, 12. A transverse mode filtration does not occur.

FIG. 4 shows the cross-section of a fiber core 2 with the inventive refractive index variation 6 within the Fabry-Perot cavity. This structure causes a mode-dependent variation of the optical path length within the fiber core 2. Shown in FIG. 4 is a stepped index variation with a circular geometry in core 2 of an LMA fiber. The field curves 1a, 1b of the different transversal modes LP01 and LP11, in which the light propagates in the fiber, have different overlapping regions with the index-modified region 6, as shown in FIG. 4. The field curve 1a of the base mode LP01 has a larger overlap with the index-modified region 6 than the field curve 1b of mode LP11 of higher order. This leads to a stronger modification of the optical path length for the base mode LP01 than for the mode LP11 of higher order.

Illustrated in FIG. 5 are the reflectance spectrae of the reflective elements 5 and of the Fabry-Perot cavity with fiber Bragg gratings for the case with the inventive refractive index variation 6. Index variation 6 within the cavity shifts the optical path length of the various modes in different extent. Therefore, the reflectance spectrae of the reflective elements and of the Fabry-Perot cavity get a shifting towards each other. As shown in FIG. 5a, it results an offset of the wavelengths of resonance 8 of the reflective elements 5 towards the corresponding resonance 7 of the Fabry-Perot cavity for the base modes. At the same time the transmission peak 9 in the reflectance spectrum of the Fabry-Perot cavity for the modes of higher order remains at the wavelength of the reflectance peak 10 of the reflective elements 5. Hereof, it results the overall reflectance spectrum as shown in FIG. 5b with a strongly reduced reflectance peak 11 for the modes of higher order and an accentuated reflectance peak 12 for the base modes. To this extent the invention is suitable to separate the base modes from the modes of higher order. Hence, with the refractive index modification within the Fabry-Perot cavity, the desired transverse mode filtration is realized.

FIGS. 6 and 7 show different possible geometries of the transversal refractive index modification 6 within the fiber core 2. The invention makes it possible to adapt and to optimize the effect of the structure according to the field distribution of the occurring modes. FIG. 6 shows some possible geometries which are centered on the waveguide axis. Each of these geometries takes a different effect on the transverse mode filtration. As compared with the geometries of FIGS. 6a and 6c, the geometry shown in FIG. 6b causes a polarization dependence of the filtration. In accordance with the invention, the index-modified region 6 may also be arranged at the edge of the fiber core 2. FIGS. 7a and 7c show index modifications in the outer region of the fiber core which do not cause a polarization dependence of the filtration, whereas the filtration with the geometry according to FIG. 7b is polarization-dependent. The index modification may also be realized in the fiber shell (not shown here).

Illustrated in FIG. 8 is an inventive transverse mode filter in which the fiber core 2 in the region of the reflective elements 5 comprises a transversal refractive index variation 6. The other regions of the fiber core 2, more particularly those within the Fabry-Perot cavity between the reflective elements 5, remain invariable. With this variant, too, all possible geometries of the index variation are conceivable.

The invention claimed is:

1. Transverse mode filter in an optical waveguide, wherein the filter is comprised of a Fabry-Perot cavity integrated into the optical waveguide, the Fabry-Perot cavity comprising two reflective elements situated at a distance from one another,
   wherein the reflective elements are waveguide Bragg gratings,
   wherein the wavelength of at least one mode of the optical waveguide differs from the resonant wavelengths of the Fabry-Perot cavity, whereas the wavelength of at least a second mode of the optical waveguide mainly coincides with a resonant wavelength of the Fabry-Perot cavity,
   wherein the optical waveguide is a light-conducting fiber having a fiber core, and
   wherein the waveguide is modified in the region of the Fabry-Perot cavity and/or in the region of the reflective elements in relation to the remaining regions of the waveguide, the modification being effected by the fiber core within the Fabry-Perot cavity and/or in the region of at least one of the reflective elements having a refractive index variation running transversally to the waveguide axis, whereas the index variation causes a mode-dependent variation of the optical path length within the fiber core.

2. Transverse mode filter according to claim 1, wherein the reflection spectrae of the reflective elements have resonances, and
   wherein the wavelength of at least one of these resonances differs from the resonant wavelengths of the Fabry-Perot cavity.

3. Transverse mode filter according to claim 1, wherein the reflective elements have equal reflectance spectrae.

4. Transverse mode filter according to claim 1, wherein the transverse refractive index variation has a stepped curve or a gradient curve.

5. Transverse mode filter according to claim 1, wherein the geometry of the transversal refractive index variation is circular, elliptical, annular, cross-shaped, rectangular, or quadratic.

6. Transverse mode filter according to claim 1, wherein the transversal refractive index variation in the direction of two transversal axes of the waveguide being orthogonal to each other is different.

7. Transverse mode filter in an optical waveguide, wherein the filter comprises a Fabry-Perot cavity integrated into the optical waveguide, the Fabry-Perot cavity comprising two reflective elements situated at a distance from one another and having different reflection spectrae,
   wherein the reflective elements are waveguide Bragg gratings,
   wherein the wavelengths of the modes of the optical waveguide mainly coincide with the resonant wavelengths of the Fabry-Perot cavity,
   wherein the optical waveguide is a light-conducting fiber having a fiber core, and
   wherein the waveguide is modified in the region of the Fabry-Perot cavity and/or in the region of the reflective elements in relation to the remaining regions of the waveguide, the modification being effected by the fiber core within the Fabry-Perot cavity and/or in the region of at least one of the reflective elements having a refractive index variation running transversally to the waveguide axis, whereas the index variation causes a mode-dependent variation of the optical path length within the fiber core.

8. Laser, more particularly a fiber laser, comprising a transverse mode filer according to claim 1.

* * * * *